United States Patent [19]
Abendroth

[11] Patent Number: 4,784,887
[45] Date of Patent: Nov. 15, 1988

[54] LAMINATE WOOD STRUCTURE

[75] Inventor: Carl W. Abendroth, Crystal Falls, Mich.

[73] Assignee: Aga, Inc., Amasa, Mich.

[21] Appl. No.: 905,284

[22] Filed: Sep. 8, 1986

[51] Int. Cl.⁴ .............................................. B32B 3/10
[52] U.S. Cl. ...................................... 428/54; 428/50; 428/120; 428/535; 428/537.1
[58] Field of Search ...................... 428/535, 537.1, 50, 428/54, 120

[56] References Cited
U.S. PATENT DOCUMENTS 2,732,597 1/1956 Contratto .............................. 428/54
3,345,244 10/1967 Stolesen et al. ................... 428/537.1
3,730,820 5/1973 Fields et al. ........................... 428/54
4,204,420 5/1980 Rogers et al. ....................... 428/535
4,326,669 4/1982 Moult et al. ......................... 428/535

Primary Examiner—Edith Buffalow
Attorney, Agent, or Firm—Michael, Best & Friedrich

[57] ABSTRACT

Disclosed herein is a laminate wood structure in the form of a board having a surface composed substantially entirely of edge-grain, the laminate wood stucture comprising a plurality of elongate plain-sawn wooden strips each having exposed edge grain along at least one edge, the wooden strips being arranged in parallel stacked relationship to one another such that the surface is collectively formed by the edges of the plurality of strips.

9 Claims, 1 Drawing Sheet

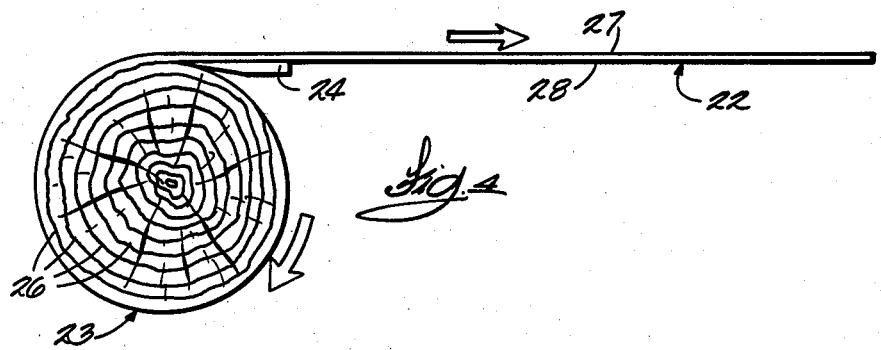
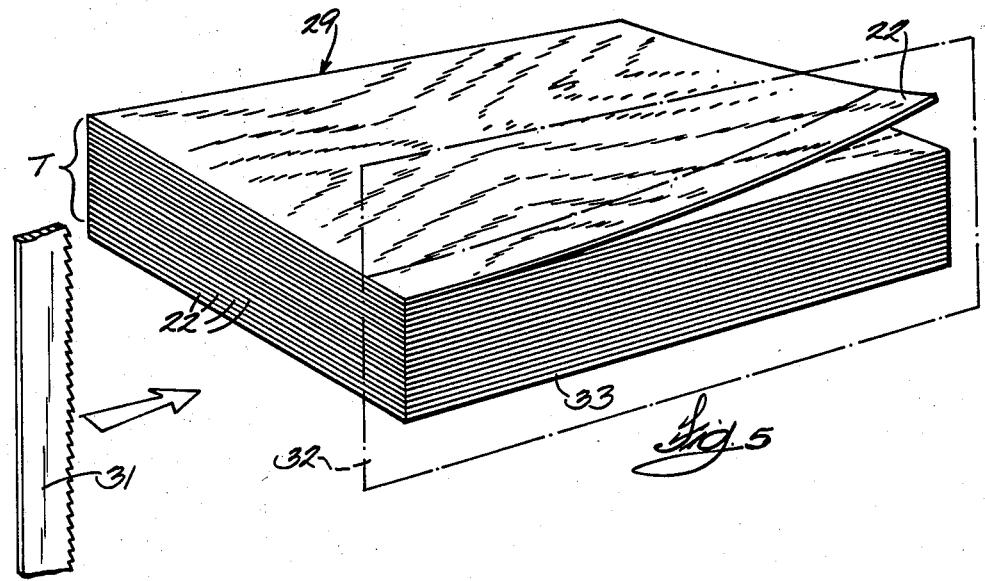
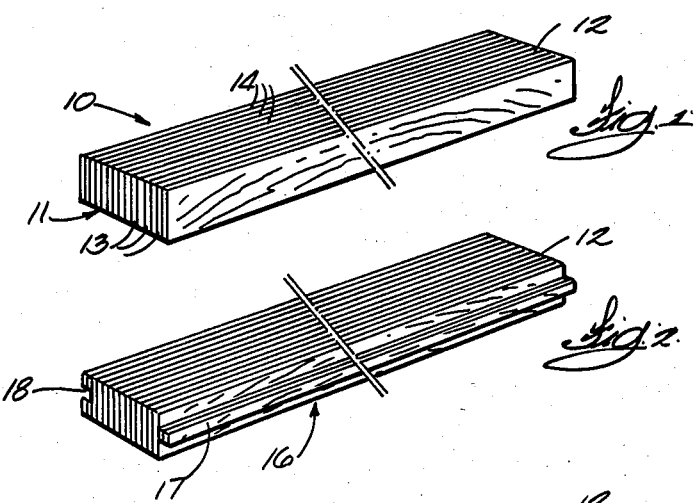
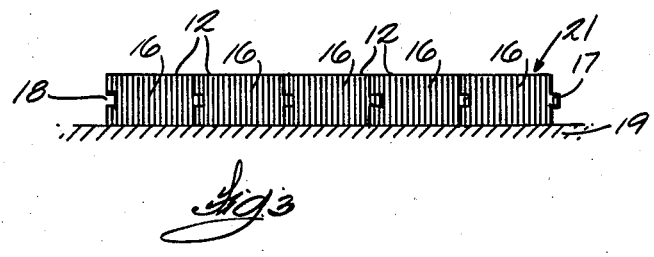

LAMINATE WOOD STRUCTURE

BACKGROUND OF THE INVENTION

This invention relates generally to laminate wood structures and more particularly to laminate wood structures which provide a working surface composed substantially of edge-grain.

Wood, by its very nature, swells and shrinks with changes in its moisture content. This can give rise to a variety of problems such as open seams, warping, shrinkage or cupping when solid wood planks are used as flooring, paneling, trim and the like.

Because the movement during swelling or shrinkage of wood is most noticeable across the wood grain, quarter-sawn or edge-grain wood exhibits less tendency to swell and shrink than does plain-sawn or flat-grain wood. Edge-grain wood also exhibits superior wear characteristics and hence is desirable for use in applications where dimensional stability and wear resistance are of importance. However, quarter-sawing is not a practical way to saw lumber or slice veneers and hence, plain-sawn lumber is more commonly available.

SUMMARY OF THE INVENTION

The invention provides a laminate wood structure in the form of a board having a surface composed substantially entirely of edge-grain, the laminate wood structure comprising a plurality of elongate plain-sawn wooden strips each having exposed edge-grain along at least one edge, the wooden strips being arranged in parallel stacked relationship to one another such that the surface is collectively formed by the edges of the strips.

The invention also provides a method of forming a laminate wood structure in the form of a board having a desired length, width and thickness, and having a surface composed substantially of edge grain, the method comprising the steps of providing a plurality of substantially planar, plain-sawn wooden veneers each having a dimension along the direction of the wood grain of the veneer at least as long as the desired length of the board, bonding the veneers to one another in substantially parallel stacked relationship such that the direction of the wood grain of each veneer is substantially the same and such that the total thickness of the resulting stack substantially equals or exceeds the desired width of the board, and further comprising the step of ripping the stack along the direction of the wood grain of the veneers and perpendicularly to the plane of the veneers so as to form an elongate board having the desired thickness and a surface composed of the edge-grain of the individual veneers exposed along the rip.

The invention also provides a laminate wood structure in the form of a board having a desired length, width and thickness, and having a surface composed substantially of edge-grain, the laminate wood structure comprising a plurality of elongate plain-sawn wooden strips, each of the strips having a length substantially equal to the desired thickness of the laminate wood structure, a substantially uniform thickness, a width substantially equal to the thickness of the laminate wood structure and an edge extending the length of the strip along which edge edge-grain is exposed, the strips being arranged and bonded to each other in parallel stacked relation such that the edges of the strips are substantially co-planar with one another so as to form the surface composed substantially of edge grain, the structure including a sufficient number of strips so that the total thickness of the strips is substantially equal to the desired width of the laminate wood structure.

Other principal features and advantages of the invention will become apparent to those skilled in the art upon review of the following detailed description, claims, and drawings.

BRIEF DESCRIPTION OF THE DRAWINGS

FIG. 1 is a perspective view of a laminate wood structure embodying the invention.

FIG. 2 is a perspective view of a floor board manufactured from the laminate wood structure illustrated in FIG. 1.

FIG. 3 is a fragmentary cross-sectional view of a floor including a plurality of floor boards of the type illustrated in FIG. 2.

FIG. 4 is a diagrammatic sideview depicting a method employed in forming wooden veneers for utilization in conjunction with one aspect of the invention.

FIG. 5 is a diagrammatic perspective view showing a plurality of veneers stacked in accordance with one aspect of the invention and depicting one manner in which the stack can be sawn to form the laminate wood structure shown in FIG. 1.

Before one embodiment of the invention is described in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and the terminology used herein is for the purpose of description and should not be regarded as limiting.

DESCRIPTION OF THE PREFERRED EMBODIMENT

Referring to the drawings, and in particular to FIG. 1, a laminate wood structure is indicated generally by reference numeral 10 and comprises an elongate board 11 having a predetermined desired length, width and thickness. As illustrated, board 11 is of substantially uniform thickness and is generally rectangular in both plan and cross-section. To provide improved dimensional stability as well as improved wear characteristics, board 11 includes an upper or working surface 12 composed substantially of edge-grain.

As further illustrated in FIG. 1, the board 11 comprises a plurality of elongate plain-sawn wooden strips 13 each having a length, or horizontal dimension as shown in the figure, substantially equal to the desired length of the board 11. The width, or vertical dimension as illustrated in the figure, of each wooden strip 13 is relatively thin or narrow and is substantially equal to the desired thickness of the board 11 and the thickness of each wooden strip 13 is substantially uniform over the length of the strip. Each strip 13 also includes, extending along its length, an edge 14 along which edge-grain is exposed. To form the board 11, the strips 13 are arranged and bonded to each other in parallel stacked relation such that the edges 14 of the strips are substantially co-planar with one another so as to collectively form the upper surface 12 composed substantially of edge-grain. Board 11 includes a sufficient number of strips 13 so that the sum of the thicknesses of the strips is substantially equal to the desired width of the board 11. Preferably, the strips 13 are bonded to each other by means of gluing and the color of the glue is matched to the color of the wood so that the joints between the individual wooden strips are substantially invisible. Urea resin glues are suitable for this purpose. Preferably, each of the wooden strips 13 is of sufficient length to extend continuously along the full length of the board 11, although it will be appreciated that in some applications, such as where extreme board length is required, it may be desireable to abut the ends of two or more separate segments within each strip.

FIG. 2 depicts a tongue and groove floor board 16 fashioned from the laminate board 11 illustrated in FIG. 1. As shown, the side edges of the board 11 have been milled to form a projecting tongue 17 along one edge and a complimentary groove 18 along the opposite edge.

In FIG. 3, a plurality of the floor boards 16 have been placed side-by-side over a sub-floor foundation 19 such that the tongues 17 and grooves 18 of adjacent boards 20 interlock as shown. When so arranged, the upper surfaces 12 of the individual floor boards 16 collectively form a substantially planar floor surface 21 composed substantially entirely of edge-grain.

A method of forming the laminate wood structure 10 is illustrated in FIGS. 4 and 5. First, a plurality of substantially planar, plain-sawn wooden veneers 22 are provided. Such veneers can be obtained through use of any one of several known techniques such as by rotating a log 23 past a sharpened, relatively stationary, elongate planing knife 24 so as to peel off the veneer 22 as illustrated in FIG. 4. Log 23 includes a plurality of substantially concentric annual growth rings 26 which, for clarity of illustration, have been enlarged in FIG. 4. Preferably, the planing knife 24 is disposed so as to engage the log 23 substantially tangentially to the annal growth rings 26 and thereby produce a veneer 22 exhibiting considerable flat-grain along its upper and lower surfaces 27 and 28 respectively. Preferably, the lengths of the log 23 and the planing knife 24 are such that each of the wooden veneers 22 has a dimension along the direction of the wood grain at least as long as the desired length of the board 11 (FIG. 1) to be produced.

Next, as illustrated in FIG. 5, the plain-sawn wooden veneers 22 are arranged and bonded to one another in substantially parallel stacked relationship such that the direction of the wood grain of each veneer is substantially the same and such that the total thickness T of the resulting stack substantially equals or exceeds the desired width of the board 11. Once the veneers have been bonded to one another so as to form a substantially unitary structure, the stack 29 is ripped by means of a saw blade 31 along a plane 32 extending along the direction of the wood grain and perpendicularly to the plane of the veneers so as to form the board 11. Plane 31 is preferably displaced from the elongate side edge 33 of the stack 29 by a distance substantially equal to the desired thickness of the board 11. Alternatively, the distance between the plane 32 and the side edge 33 can be increased so as to allow for finish planing of the board 11 down to the desired thickness. It will be appreciated that the stack 29 can be successively ripped so as to produce a plurality of boards 11 from each stack.

By way of example, the stack 29 can be formed of a plurality of maple veneer sheets of one-tenth inch thickness or greater. However, thinner veneers can also be used. Typically, the veneer sheets are cut in swatches of fifty-six inches and sixty-four inches but can be cut as long as twelve feet. The thickness T to which the veneers are stacked and glued is determined by the desired width of the finished strip. For example, the veneer sheets can be stacked to 2½ inch thickness in order to produce 2¼ inch tongue and groove flooring strips, and up to 8½ inch thickness to produce 8-inch tongue and groove flooring or other planks. The glued up stack 29 is ripped lengthwise through its thickness to the nominal thickness of the finished flooring strip. For example, the stack can be ripped at one-half inch increments in order to produce ⅜ inch thickness flooring. Ripping at 15/16 inch increments is appropriate for providing ¾ inch thickness flooring. It will be appreciated that these dimensions are provided for example only and can be varied as appropriate for any particular application. Once the boards 11 have been ripped from the glued-up stack 29, they may be left full length or may be cut to provide random length flooring.

Because the laminate wood structure described herein provides a working surface composed substantially entirely of edge-grain, the dimensional stability of the structure across its width is substantially improved over that of a solid, plain-sawn plank of similar dimension. Furthermore, because the surface of each board exposed to the greatest wear is formed of durable edge-grain, woods other than hard maple and oak can be successfully employed and considerable economic savings thereby realized. Finally, the finished laminate wood structure, being composed essentially entirely of solid wood and color matched glue, retains the aesthetically pleasing appearance of solid wood. Alternatively, veneers of two or more different woods can be combined to provide a multi-tone effect.

Although a preferred embodiment of the invention has been described in considerable detail, such description is intended to be illustrative rather than limiting, for the invention may be variously embodied and is to be limited only by interpretation of the claims which follow.

I claim:

1. A laminate wood structure in the form of a generally rectangular board having a length, a wdith, and a thickness, said length and said width defining a surface composed substantially entirely of edge-grain, said laminate wood structure comprising a plurality of elongate plain sawn wood strips each having exposed edge-grain along at least one edge, said wood strips being arranged in parallel stacked relationship to one another such that said surface is collectively formed by said edges of said plurality of strips.

2. A laminate wood structure according to claim 1 wherein said wooden strips are bonded to each other so as to form a sold unitary structure.

3. A laminate wood structure according to claim 2 wherein said wooden strips are bonded to each other by means of gluing.

4. A laminate wood structure according to claim 1 wherein the wood grain in each of said elongate wood strips extend substantially along the direction of the length of each said strip.

5. A laminate wood structure according to claim 4 wherein each of said strips is of sufficient length to extend continuously along the entire length of said laminate wood structure.

6. A laminate wood structure in the form of a board having a desired length, a desired width of lesser demension than said desired length, and a thickness of lesser demension than said desired width, said laminate wood structure comprising a plurality of elongate plain sawn wood strips each having a length substantially equal to said desired length of said structure, a substantially uniform thickness, and a width substantially equal to said desired thickness of said structure, said thickness and one of said length and said width of said strips defining an edge with exposed edge-grain, said strips being bonded to each other in parallel stacked relation such that said edges of said strips are substantially coplanar with one another so as to form a surface composed substantially of edge grain, said structure including a sufficient number of said strips so that the totality of said thicknesses of said strips is substantially equal to said desired width of said laminate wood structure.

7. A laminate wooden structure according to claim 6 wherein the wood grain in each of said wood strips extends substantially along said length of said strip.

8. A laminate wood structure according to claim 6 wherein said wood strips are bonded to each other by means of gluing.

9. A laminate wood structure in accordance with claim 8 wherein the color of said glue is matched to the color of the wood whereby the joints between said plys of said wood structure are substantially invisible.

* * * * *